United States Patent [19]
McGaugh

[11] Patent Number: 6,045,197
[45] Date of Patent: Apr. 4, 2000

[54] AFTERCOOLER WITH THERMOSTATICALLY CONTROLLED BYPASS

[75] Inventor: Everett W. McGaugh, Lawrence, Kans.

[73] Assignee: Haldex Brake Corporation, Kansas City, Mo.

[21] Appl. No.: 09/153,101

[22] Filed: Sep. 15, 1998

[51] Int. Cl.[7] .................................................. B60T 17/00
[52] U.S. Cl. ...................... 303/1; 123/41.01; 188/264 R
[58] Field of Search ...................... 303/1, 12; 188/264 R;
123/41.01, 41.48, 41.31, 41.1, 41.08; 165/41,
42, 132, 100; 62/640, 644, 648, 93, 179;
55/410.1, 318, 282.2, 417, 498, DIG. 17;
96/109, 116, 144, 113, 114, 137, 407, 408;
137/206; 236/47, 49.3, 34.5, 93 R; 60/599,
606; 417/243

[56] References Cited

U.S. PATENT DOCUMENTS

| | | |
|---|---|---|
| 2,400,615 | 5/1946 | Warrick et al. . |
| 3,607,153 | 9/1971 | Cjer . |
| 3,749,308 | 7/1973 | Fernandes et al. . |
| 3,819,235 | 6/1974 | Bowler et al. . |
| 3,841,064 | 10/1974 | Hitchiner et al. . |
| 3,934,990 | 1/1976 | Ide ......................................... 137/204 |
| 3,937,276 | 2/1976 | Ostwald .................................. 165/135 |
| 4,074,663 | 2/1978 | Cory . |
| 4,097,248 | 6/1978 | Frantz ......................................... 55/33 |
| 4,124,979 | 11/1978 | Tholen et al. . |
| 4,237,696 | 12/1980 | Coblentz . |
| 4,325,219 | 4/1982 | Stang et al. ............................... 60/599 |
| 4,517,929 | 5/1985 | Musick et al. ......................... 123/41.1 |
| 4,620,509 | 11/1986 | Crofts ................................... 123/41.1 |
| 4,697,551 | 10/1987 | Larsen et al. ......................... 123/41.31 |
| 4,707,166 | 11/1987 | Khosropour . |
| 4,812,148 | 3/1989 | Hata et al. ......................... 55/DIG. 17 |
| 5,002,593 | 3/1991 | Ichishita et al. . |
| 5,186,522 | 2/1993 | Spencer ....................................... 303/1 |
| 5,190,569 | 3/1993 | McGrath . |
| 5,417,275 | 5/1995 | Vallejo . |
| 5,560,325 | 10/1996 | Lindberg et al. .................... 188/264 R |
| 5,575,541 | 11/1996 | Elamin ......................................... 303/1 |
| 5,669,338 | 9/1997 | Pribble et al. ....................... 123/41.31 |

OTHER PUBLICATIONS

Anchorlok brochure (product specifications for air dryer), 5 pages, undated.
Haldex brochure (product specifications for condensor unit), 4 pages, undated.

Primary Examiner—Douglas C. Butler
Attorney, Agent, or Firm—St. Onge Steward Johnston & Reens LLC

[57] ABSTRACT

A cooler for air in a pneumatic brake system which includes a thermostatically controlled bypass is provided. The cooler includes a chamber which has an air inlet, an air outlet and a cooler outlet. The cooler also includes an air delivery which is in fluid communication with the air outlet. A cooling passageway is in fluid communication with the cooler outlet and the air delivery. A valve mounted within the chamber is biased to a closed position placing the air inlet and air outlet in fluid communication and is movable against the bias toward an open position placing the air inlet in fluid communication with the cooler outlet. A thermostat is mounted within the chamber such that when air entering the air inlet is above a predetermined temperature the thermostat moves the valve against the bias toward the open position to direct air through the cooling passageway.

14 Claims, 4 Drawing Sheets

AFTERCOOLER WITH THERMOSTATICALLY CONTROLLED BYPASS

FIELD OF THE INVENTION

The invention relates to an air aftercooler for a pneumatic brake system typically used on commercial vehicles, such as trucks and the like, and more particularly to an air aftercooler having a thermostatically controlled bypass. In another aspect, the invention relates to an air aftercooler thermostat valve for a pneumatic brake system.

BACKGROUND OF THE INVENTION

In pneumatic brake systems, air is typically supplied by an air compressor. The compressed air is usually passed through an air dryer to remove moisture from the air which might adversely affect performance and longevity of the system. Under normal conditions, the temperature of air leaving the compressor is typically between 200–350° F. The standard maximum recommended air input temperature for air dryers, however, is 150°–160° F. As such, aftercoolers have sometimes been interposed between compressors and dryers to reduce the temperature of air leaving the compressor to a level acceptable for input to an air dryer. A disadvantage of aftercoolers, though, is that in extremely cold environments they may disadvantageously reduce the temperature of air entering the dryer to below 32° F. such that any moisture in the air may freeze and clog the dryer, adversely affecting system operation.

U.S. Pat. No. 3,841,064 to Hitchiner et al. discloses an aftercooler having a condensate discharge valve built into the bottom thereof so as to be heated by the air from the compressor. The typically warm air leaving the compressor inhibits condensate from freezing within the aftercooler discharge valve, thereby inhibiting clogging. A disadvantage of this design, however, is that clogging of the air dryer by freezing condensate may still occur.

U.S. Pat. No. 4,237,696 to Coblentz discloses a compressed air system having a bypass/repass valve to bypass or repass the heat exchanger coils when the temperature reaches a predetermined level. The valve, which is positioned before the compressor, can be manually manipulated or operated automatically through a thermostat connected by wiring to a damper motor connected by a standard damper linkage to the valve. A disadvantage of this prior art design is that the bypass valve is designed to operate in conjunction with a cooler and dryer unit located before the air compressor. Thus, heating which occurs within the compressor itself necessitates the provision of a second cooler and dryer unit located after the compressor, thereby increasing the cost of the compressed air system. Another disadvantage of this prior art design is that the bypass/repass valve system is complex, including electromagnetic components, such as a damper motor. As such, the system is costly to produce and prone to mechanical failure.

What is desired, therefore, is an air aftercooler for a pneumatic brake system which inhibits clogging of the air dryer by freezing condensate, which is capable of being located in the brake system downstream of the compressor and which is reliable and not prone to mechanical failure.

SUMMARY OF THE INVENTION

Accordingly, it is an object of the present invention to provide an air aftercooler for a pneumatic brake system which inhibits clogging of the air dryer by freezing condensate.

Another object of the present invention is to provide an air aftercooler for a pneumatic brake system having the above characteristics and which cools air output from the compressor to a level acceptable by the air dryer when the air output by the compressor is initially above the acceptable level.

A further object of the present invention is to provide an air aftercooler for a pneumatic brake system having the above characteristics and which is capable of being located in the brake system after the compressor.

Still another object of the present invention is to provide an air aftercooler for a pneumatic brake system having the above characteristics and which is reliable and not prone to mechanical failure.

These and other objects of the present invention are achieved by provision of a cooler for air in a pneumatic brake system which includes a thermostatically controlled bypass. The cooler includes a chamber which has an air inlet, an air outlet and a cooler outlet. The cooler also includes an air delivery which is in fluid communication with the air outlet. A cooling passageway is in fluid communication with the cooler outlet and the air delivery. A valve mounted within the chamber is biased to a closed position placing the air inlet and air outlet in fluid communication and is movable against the bias toward an open position placing the air inlet in fluid communication with the cooler outlet. A thermostat is mounted within the chamber such that when air entering the air inlet is above a predetermined temperature the thermostat moves the valve against the bias toward the open position to direct air through the cooling passageway.

The invention and its particular features and advantages will become more apparent from the following detailed description considered with reference to the accompanying drawings.

DETAILED DESCRIPTION OF THE INVENTION

Figure 1:
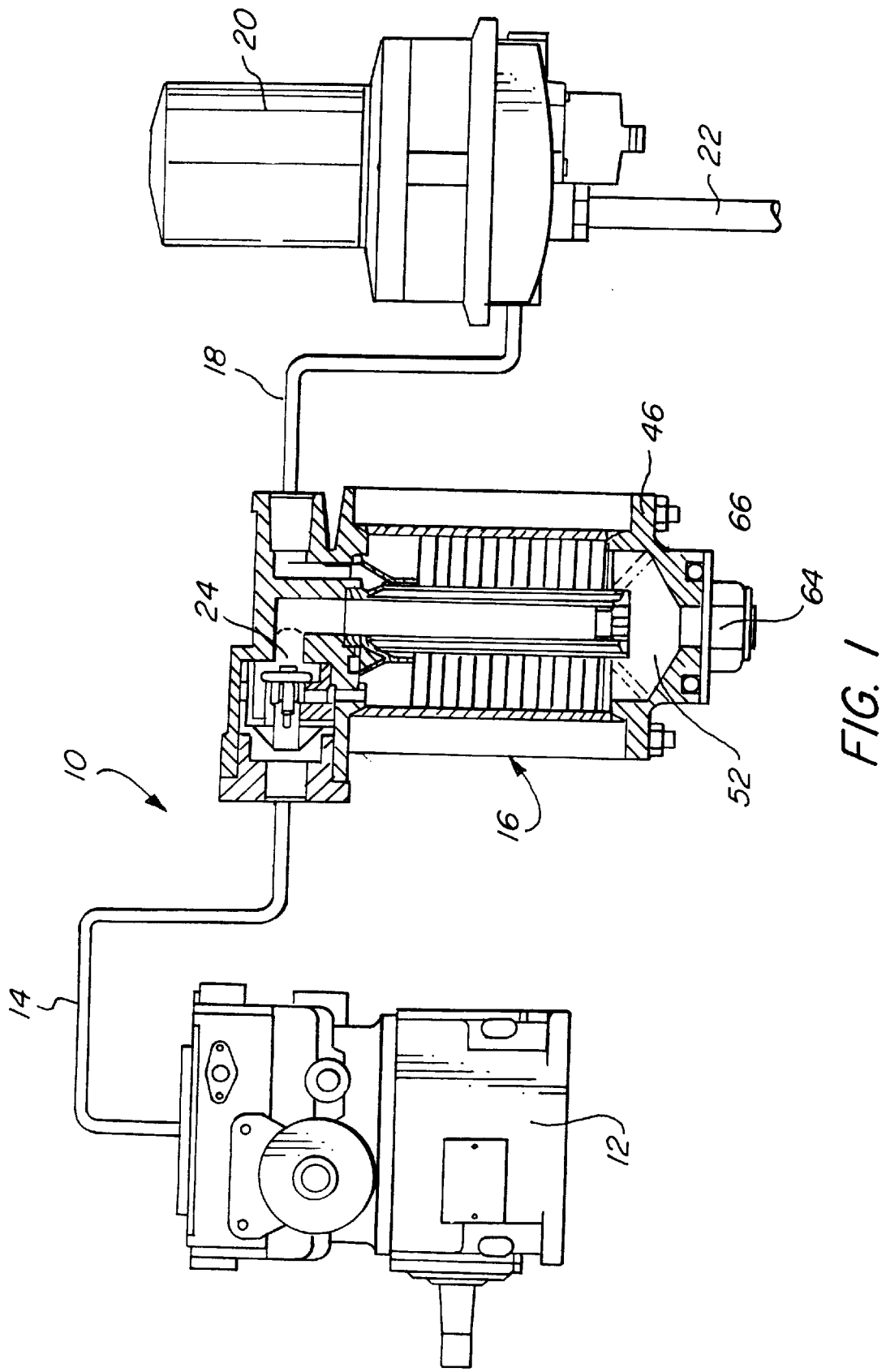
FIG. 1 is schematic illustration of a portion of a pneumatic brake system, including an air aftercooler with a thermostatically controlled bypass in accordance with the present invention, with parts broken away and in section.

Referring first to FIG. 1, a portion of a pneumatic brake system 10 is shown in which compressor 12 compresses input air. The compressed air is directed through air line 14 to aftercooler 16 and then through air line 18 to air dryer 20. Moisture is removed from the compressed air by air dryer 20 and the air is directed to the remainder of the pneumatic brake system (not shown) through air line 22. As is discussed in the background, air dryer 20 has a maximum recommended air input temperature, typically between 150°–160° F., above which air dryer 20 will not function efficiently. Thermostatically controlled bypass 24, which is the subject of the present invention, is disposed between compressor 12 and aftercooler 16. Although in a preferred embodiment shown in FIGS. 1–3 bypass 24 is shown as an integral part of aftercooler 16, it is understood that bypass 24 could also be integrally built as part of compressor 12, or could itself comprise a separate unit disposed between compressor 12 and aftercooler 16.

Figure 2:
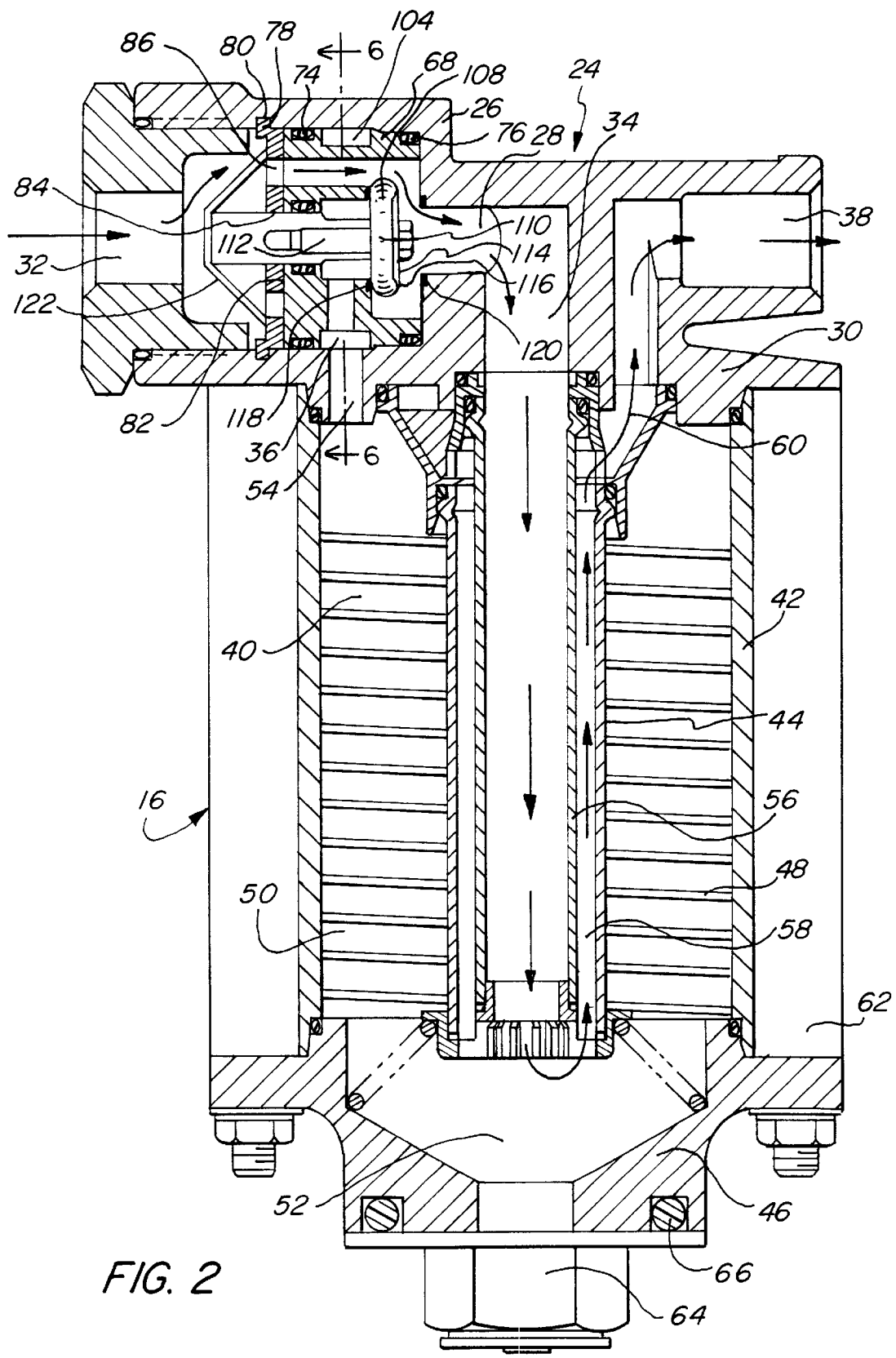
FIG. 2 is a partially cross-sectional side view of the air aftercooler with a thermostatically controlled bypass of FIG. 1 shown in the closed position.
Figure 3:
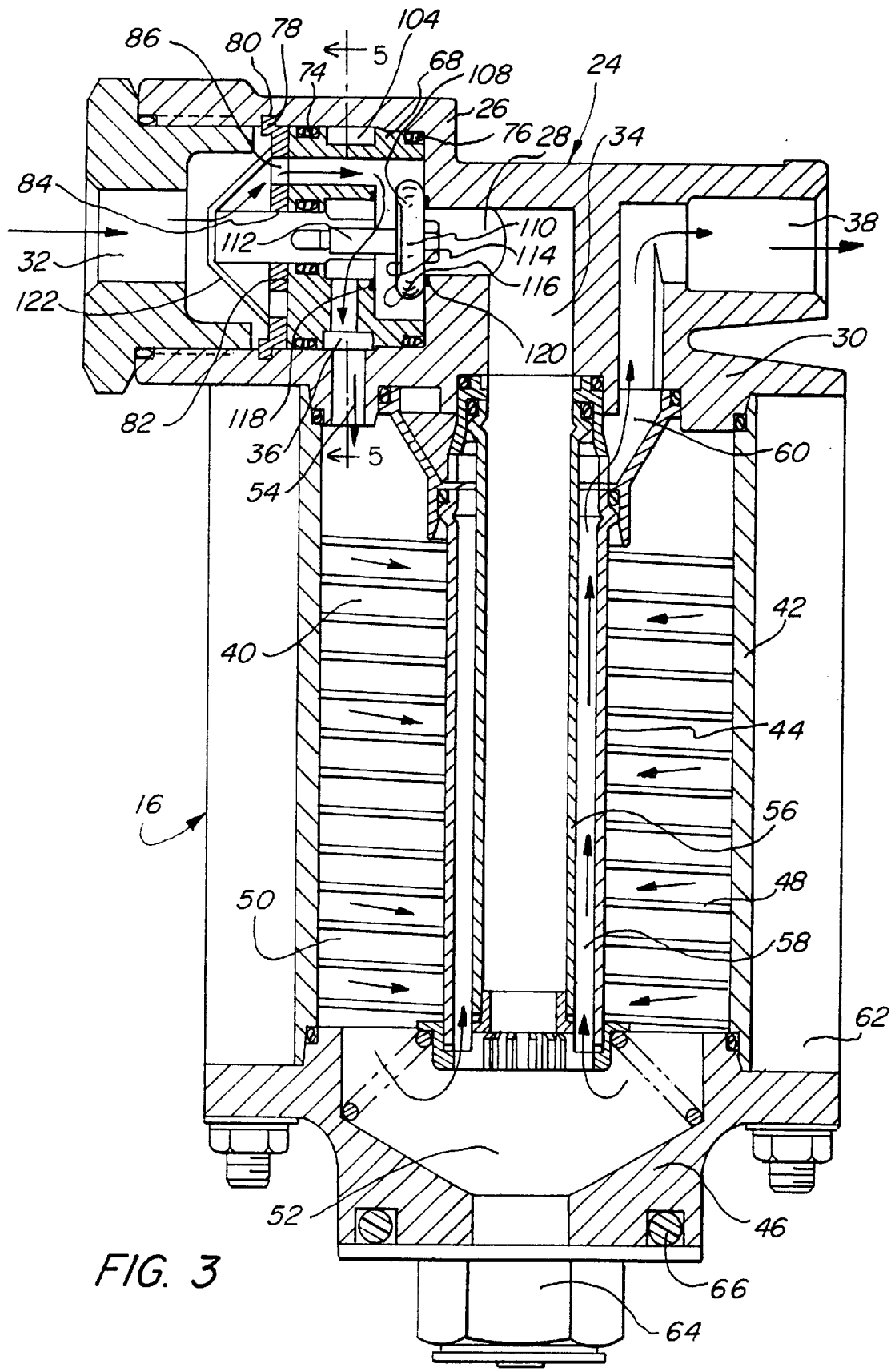
FIG. 3 is a partially cross-sectional side view of the air aftercooler with a thermostatically controlled bypass of FIG. 1 shown in the open position.

Referring to FIGS. 2 and 3, thermostatically controlled bypass 24 includes a housing 26 which defines a chamber 28. In the preferred embodiment shown in FIGS. 1–3, housing 26 may partially share a surface with an upper wall 30 of aftercooler 16. Chamber 28 includes an air inlet 32, an air outlet 34 and a cooler outlet 36. Housing 26 also defines an air delivery 38. Air inlet 32 is in fluid communication with air line 14, while air delivery 38 is in fluid communication with air line 18.

Aftercooler 16 includes a cooling passageway 40, which is defined by upper wall 30, an outer wall 42, an inner wall 44, a bottom wall 46 and a helical plate 48. Outer wall 42 and inner wall 44 are preferably tubular in shape, with inner wall 44 being disposed within outer wall 42 and attached thereto by helical plate 48 such that a continuous helical cooling coil 50 is formed from substantially the top to substantially the bottom of helical plate 48. Outer wall 42 extends downward beyond the bottom edge of inner wall 44, with bottom wall 46 acting to sealingly cap the bottom end of outer wall 42 such that a reservoir 52 is formed between the bottom of helical plate 48 and bottom wall 46.

The top ends of outer wall 42 and inner wall 44 are sealingly capped by upper wall 30, which includes an inlet port 54. Inlet port 54 is located between outer wall 42 and inner wall 44 such that inlet port 54 is in fluid communication with cooling coil 50. Disposed within inner wall 44 is hollow interior member 56. Interior member 56 and inner wall 44 together define a passage 58 which is in fluid communication with an exit port 60. Exit port 60 is located between interior member 56 and inner wall 44 such that exit port 60 is in fluid communication with air delivery 38. Thus, reservoir 52 is in fluid communication with air delivery 38 through passage 58 and exit port 60. Moreover, interior member 56 is located such as to put air outlet 34 in fluid communication with reservoir 52.

Helical plate 48 and outer wall 42 are formed from a material with properties favorable to heat exchange, such as aluminum. To further aid in heat exchange, fins 62 may be provided along the external surface of outer wall 42. During cooling of the compressed air, moisture may accumulate within cooling passageway 40. The helical arrangement of cooling coil 50 would direct such condensate downward to collect in reservoir 52. A drain valve 64 is provided in bottom wall 46 to allow the condensate to exit aftercooler 16. Heating element 66 is also provided in bottom wall 46 to inhibit the condensate from freezing and clogging drain valve 64.

Disposed within chamber 28 is insert 68, which is sized and shaped to fit within chamber 28. Insert 68 includes annular channels 70, 72 in which O-rings 74, 76 are disposed. O-rings 74, 76 act to seal insert 68 within chamber 28 so that substantially no air can flow therebetween. Also disposed within chamber 28 is mounting disk 82. Mounting disk 82 includes a central hole 84 and a plurality of vent holes 86. Preferably, mounting disk 82 includes six vent holes 86, which are evenly spaced around central hole 84. Once insert 68 and mounting disk 82 are disposed within chamber 28, they are held therein by locking ring 78, which fits in channel 80 in housing 26 and which abuts the end of mounting disk 82.

Figure 4:
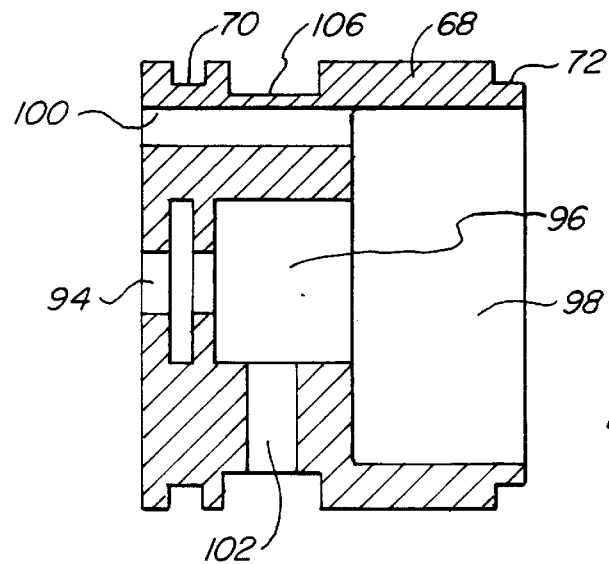
FIG. 4 is a partially cross-sectional side view of a portion of the thermostatically controlled bypass of the air aftercooler of FIG. 1.
Figure 5:
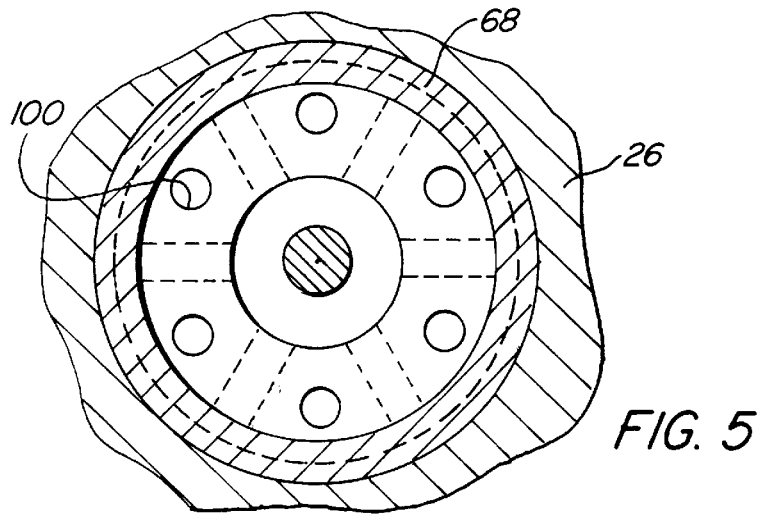
FIG. 5 is a partially cross-sectional end view of a portion of the thermostatically controlled bypass of the air aftercooler taken along line 5—5 of FIG. 2; and, FIG. 6 is a partially cross-sectional end view of a portion of the thermostatically controlled bypass of the air aftercooler taken along line 6—6 of FIG. 3.
Figure 6:
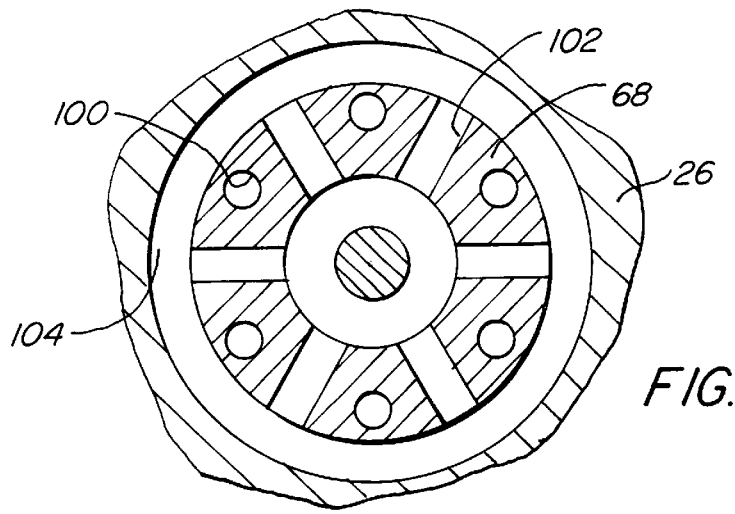

As best seen in FIGS. 4–6, insert 68 includes a central hole 94 having a diameter substantially equal to the diameter of central hole 84 of mounting disk 82. Insert 68 also includes a venting bore 96, which has a diameter larger than the diameter of central hole 94, and a valve bore 98, which has a diameter larger than the diameter of venting bore 96. A plurality of venting holes 100 pass through insert 68 from the end of insert 68 proximate to central hole 94 to valve bore 98. Venting holes 100 are evenly spaced about central hole 94, and six venting holes 100 are preferred. A plurality of radial holes 102 pass from venting bore 96 radially to a circumferential passage 104, which is defined by circumferential channel 106 about insert 68 and the inner wall of housing 26. Radial holes 102 are evenly spaced between venting holes 100, and six radial holes 102 are preferred. As can best be seen in FIGS. 5 and 6, venting bore 96 is in fluid communication with radial holes 102, which are in fluid communication with circumferential passage 104, which is in fluid communication with inlet port 54. As such, cooler outlet 36 is defined to include venting bore 96, radial holes 102, and circumferential passage 104.

Disposed within valve bore 98 is a two-sided check valve 108. Valve 108 is comprised of an insert 110 attached to a rod 112. The outwardly facing opposing faces 114 of insert 110 each include a sealing element 116 about their peripheries. Sealing elements preferably comprise half-round rubber beads which are raised approximately 0.031 inches relative to surfaces 114 of insert 110. Rod 112 is slidably disposed in central hole 84 of mounting disk 82 and central hole 94 of insert 68. Rod 112 and valve 108 are slidable from a closed position (shown in FIG. 2) where one of the sealing elements 116 engages a sealing seat 118 within valve bore 98 around the venting bore 96 portion of cooler outlet 36, and an open position (shown in FIG. 3) where the other sealing element 116 engages a sealing seat 120 within valve bore 98 around air outlet 34. Sealing seats 118, 120 comprise flat molded or machined surfaces.

The end of rod 112 opposite the end attached to valve 108 extends through central hole 84 in mounting disk 82 and is attached to a thermostat 122. Thermostat 122 is a conventional bellows type thermostat which is attached to mounting disk 82, and which includes a plurality of holes (not shown) so that air may readily pass therethrough. The material from which thermostat 122 is to be made must have thermal properties such that when the air passing through chamber 28 is at or below the maximum air input temperature of air dryer 20, thermostat 122 biases valve 108 to the closed position (shown in FIG. 2), and when air passing through chamber 28 is above the maximum air input temperature of air dryer 20, thermostat 122 moves valve 108 against the bias to the open position (shown in FIG. 3).

During operation, compressed air from air line 14 enters chamber 28 through air inlet 32, and passes thermostat 122. If the compressed air is at or below the maximum air input temperature of dryer 20, thermostat 122 biases valve 108 to the closed position (shown in FIG. 2). Thus the compressed air (illustrated by arrows) passes through vent holes 86 in mounting disk 82, and through venting holes 100 in insert 68. Since valve 108 is in the closed position, sealing element 116 is engaging sealing seat 118 and cooler outlet 36 is sealed. Thus, the compressed air is forced to flow out through air outlet 34 through interior member 56, and into reservoir 52. Since cooler outlet 36 is sealed, the air cannot flow up through cooling coils 50, and is instead forced to flow directly back up through passage 58, exit port 60, and out air delivery 38 to dryer 20, bypassing cooling passageway 40. Therefore, the compressed air exiting bypass 24 and entering dryer 20 is substantially the same temperature as the air entering bypass 24.

If the compressed air entering chamber 28 is above the maximum air input temperature of dryer 20, thermostat 122 moves valve 108 against the bias to the open position (shown in FIG. 3). Thus the compressed air (illustrated by arrows) passes through vent holes 86 in mounting disk 82, and through venting holes 100 in insert 68. Since valve 108 is in the open position, sealing element 116 is engaging sealing seat 120 and air outlet 34 is sealed. Thus, the compressed air is forced to flow through venting bore 96, radial holes 102, circumferential passage 104, cooler outlet 36, and inlet port 54 into cooling coil 50. The air is cooled as it spirals downward through cooling coil 50, until reaching reservoir 52. Since air outlet 34 is sealed, the air cannot flow up through interior member 56, and is instead forced to flow up through passage 58, exit port 60, and out air delivery 38 to dryer 20. Therefore, the compressed air exiting bypass 24 and entering dryer 20 has passed through cooling passageway 40 and has a temperature less than the temperature of the air entering bypass 24. Any condensate formed within cooling passageway 40 is expelled through drain valve 64.

The present invention, therefore, provides an air aftercooler for a pneumatic brake system which inhibits clogging of the air dryer by freezing condensate, which is capable of being located in the brake system after the compressor and which is reliable and not prone to mechanical failure.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A cooler for air in a pneumatic brake system comprising:
   a chamber having an air inlet, an air outlet and a cooler outlet;
   an air delivery, said air delivery being in fluid communication with the air outlet;
   a cooling passageway in fluid communication with the cooler outlet and said air delivery;
   a valve mounted within the chamber, said valve biased to a closed position placing the air inlet and the air outlet in fluid communication, said valve movable against the bias toward an open position placing the air inlet in fluid communication with the cooler outlet; and,
   a thermostat mounted within the chamber such that when air entering the air inlet is above a predetermined temperature said thermostat moves said valve against the bias toward the open position to direct air through said cooling passageway.

2. The cooler of claim 1 wherein said valve includes two opposing faces, each of the opposing faces having a sealing element about its periphery, and wherein the air outlet and the cooler outlet have sealing seats such that when said valve is in the closed position the sealing element of one of the opposing faces engages the sealing seat of the cooler outlet, thereby sealing cooler outlet and directing air flow through the air outlet, and when said valve is in the open position, the sealing element of the other of the opposing faces engages the sealing seat of the air outlet, thereby sealing the air outlet and directing air flow through the cooler outlet.

3. The cooler of claim 1 wherein said thermostat acts to both bias said valve to the closed position and to move said valve against the bias to the open position.

4. The cooler of claim 1 wherein said cooling passageway comprises a hollow outer wall, a hollow inner wall, a top wall and a bottom wall, the outer wall and the inner wall being connected by a helical plate such that when said valve is in the open position air directed through the cooler outlet spirals through cooling coils defined by the inner wall, the outer wall, and the helical plate.

5. The cooler of claim 4 wherein said cooling passageway further comprises a plurality of fins protruding outwardly from an outer surface of the outer wall.

6. The cooler of claim 4 wherein the bottom wall of said cooling passageway includes a heated drain valve for allowing removal of condensate collected in said cooling passageway.

7. A cooler for air in a pneumatic brake system comprising:
   a chamber having an air inlet, an air outlet and a cooler outlet, the air outlet and the cooler outlet having sealing seats therearound;
   an air delivery, said air delivery being in fluid communication with the air outlet;
   a cooling passageway in fluid communication with the cooler outlet and said air delivery, said cooling passageway comprising a hollow outer wall, a hollow inner wall, a top wall and a bottom wall, the outer wall and the inner wall being connected by a helical plate such that the cooler outlet and said air delivery are in fluid communication via cooling coils defined by the inner wall, the outer wall, and the helical plate;
   a valve mounted within the chamber, said valve having two opposing faces, each of the opposing faces having a sealing element about its periphery, said valve biased to a closed position such that the sealing element of one of the opposing faces engages the sealing seat of the cooler outlet, thereby sealing cooler outlet and placing the air inlet and the air outlet in fluid communication, said valve movable against the bias toward an open position such that the sealing element of the other of the opposing faces engages the sealing seat of the air outlet, thereby sealing the air outlet and placing the air inlet in fluid communication with the cooler outlet; and,
   a thermostat mounted within the chamber such that when air entering the air inlet is above a predetermined temperature said thermostat moves said valve against the bias toward the open position to direct air through said cooling passageway.

8. The cooler of claim 7 wherein said thermostat acts to both bias said valve to the closed position and to move said valve against the bias to the open position.

9. The cooler of claim 7 wherein said cooling passageway further comprises a plurality of fins protruding outwardly from an outer surface of the outer wall.

10. The cooler of claim 7 wherein the bottom wall of said cooling passageway includes a heated drain valve for allowing removal of condensate collected in said cooling passageway.

11. A thermostatically controlled bypass for a cooler in a pneumatic brake system comprising:
    a chamber having an air inlet, an air outlet and a cooler outlet;
    an air delivery, said air delivery being in fluid communication with the air outlet;

a valve mounted within the chamber, said valve biased to a closed position placing the air inlet and the air outlet in fluid communication, said valve movable against the bias toward an open position placing the air inlet in fluid communication with the cooler outlet; and a thermostat mounted within the chamber such that when air entering the air inlet is above a predetermined temperature said thermostat moves said valve against the bias toward the open position.

12. The thermostatically controlled bypass of claim 11 wherein said valve includes two opposing faces, each of the opposing faces having a sealing element about its periphery, and wherein the air outlet and the cooler outlet have sealing seats such that when said valve is in the closed position the sealing element of one of the opposing faces engages the sealing seat of the cooler outlet, thereby sealing cooler outlet and directing air flow through the air outlet, and when said valve is in the open position, the sealing element of the other of the opposing faces engages the sealing seat of the air outlet, thereby sealing the air outlet and directing air flow through the cooler outlet.

13. The thermostatically controlled bypass of claim 11 wherein said thermostat acts to both bias said valve to the closed position and to move said valve against the bias to the open position.

14. In a pneumatic brake system comprising a dryer with a predetermined maximum input temperature, a cooler having a cooling passageway, and a compressor, a method of inhibiting clogging of the dryer comprising the steps of:

receiving compressed air from the compressor;

determining whether the compressed air exceeds the predetermined maximum input temperature of the dryer;

passing the compressed air directly to the dryer if the compressed air does not exceed the predetermined maximum input temperature of the dryer; and, passing the compressed air through cooling coils of the cooler and then to the dryer if the compressed air does exceed the predetermined maximum input temperature of the dryer.

* * * * *